United States Patent Office.

SAMUEL SOLOMONS, OF LONDON, ENGLAND.

Letters Patent No. 63,437, dated April 2, 1867.

---

IMPROVEMENT IN TRANSPARENT SLIDES FOR THE MAGIC LANTERN.

---

*The Schedule referred to in these Letters Patent and making part of the same.*

---

TO ALL WHOM IT MAY CONCERN:

Be it known that I, SAMUEL SOLOMONS, of London, in the county of Middlesex, Kingdom of Great Britain and Ireland, have invented certain new and useful "Improvements in Transparent Slides for Magic Lanterns, and other similar purposes;" and I do hereby declare the following to be a full, clear, and exact description of the same.

This invention relates chiefly to an improvement in or adaptation of the art or process of chromo-lithography or printing in colors from stone, whereby such art or process is rendered applicable to the printing of transparent slides for magic or phantasmagoria lanterns, and for other similar purposes.

Hitherto the art or process of chromo-lithography has been practised only with opaque or partially opaque colors, and has been applied only to paper or other similar opaque or partially opaque substances.

Now my invention consists principally in printing the subject of the transparent slide in colors from stone substantially as in the chromo-lithographic process, but using only for this purpose such colors as are transparent; that is to say, those colors that are usually employed in painting such transparent slides by hand, or such other colors as are equally transparent, instead of or in contradistinction to the ordinary opaque or partially opaque colors heretofore employed in chromo-lithographic printing. And instead of printing upon paper or other similar opaque or partially opaque substance, I print with such transparent colors upon sheets of colorless gelatine or other suitable transparent material, and I then mount such transparent prints between or upon thin sheets or plates of glass in a metal, wooden, or other frame, in the ordinary manner, for use as magic lantern or phantasmagoria slides, or for other similar purposes; or I print the subject, by the chromo-lithographic processes aforesaid, in transparent colors on to transfer paper or other suitable material, and then transfer the print so obtained on to the sheet of glass, and afterwards varnish and mount the latter in the ordinary manner for use as a magic-lantern slide or otherwise.

Having now described the nature and object of my said invention of "improvements in transparent slides for magic lanterns and other similar purposes," together with the manner in which the same is to be or may be performed or carried into practical effect, I would remark, in conclusion, that I claim as my invention, and desire to secure by Letters Patent, as a new manufacture—

A magic-lantern slide, consisting of a sheet of gelatine or its equivalent, ornamented, as herein described, and confined between two plates of glass.

In testimony whereof I have signed my name to this specification in the presence of two subscribing witnesses.

SAMUEL SOLOMONS.

Witnesses:
BRISTOW HUNT, *Solicitor and Patent Agent, 1 Serle Street, Lincoln's Inn.*
RICHARD GEORGE JAMES MORGAN, *Clerk, 1 Serle Street, Lincoln's Inn.*